(12) United States Patent
Lamarre et al.

(10) Patent No.: US 11,427,304 B2
(45) Date of Patent: Aug. 30, 2022

(54) SYSTEM AND METHOD FOR SLOWING DOWN AIRCRAFT

(71) Applicant: PRATT & WHITNEY CANADA CORP., Longueuil (CA)

(72) Inventors: Sylvain Lamarre, Boucherville (CA); Simon Lopez, Montreal (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 990 days.

(21) Appl. No.: 16/160,439

(22) Filed: Oct. 15, 2018

(65) Prior Publication Data

US 2020/0115037 A1   Apr. 16, 2020

(51) Int. Cl.
   *B64C 11/00* (2006.01)
   *B64C 11/30* (2006.01)

(52) U.S. Cl.
   CPC .......... *B64C 11/002* (2013.01); *B64C 11/305* (2013.01)

(58) Field of Classification Search
   CPC .................. B64C 11/002; B64C 11/305
   See application file for complete search history.

(56) References Cited

U.S. PATENT DOCUMENTS

| | | | |
|---|---|---|---|
| 3,946,554 | A | 3/1976 | Neumann |
| 4,446,696 | A | 5/1984 | Sargisson et al. |
| 6,672,835 | B1 | 1/2004 | Hugues |
| 7,775,044 | B2 | 8/2010 | Julien et al. |
| 9,835,044 | B2 | 12/2017 | Lecordix |
| 10,227,931 | B2 | 3/2019 | Stockwell |
| 10,487,682 | B2 | 11/2019 | Duke et al. |

FOREIGN PATENT DOCUMENTS

GB    828858 A    2/1960

OTHER PUBLICATIONS

Extended European Search Report dated Feb. 21,2020 in connection with European Patent Application No. 19202266.3.

*Primary Examiner* — Nicholas McFall
(74) *Attorney, Agent, or Firm* — Norton Rose Fulbright Canada LLP

(57) ABSTRACT

Methods and systems for slowing down an aircraft having a propeller. The method comprises operating the propeller at a reference speed with the propeller blades in a first position, applying a load to the propeller to slow down a rotational speed of the propeller when the propeller is in a windmilling state or just before the propeller enters the windmilling state, adjusting the propeller blades to a second position in response to the load being applied, to increase the rotational speed of the propeller back towards the reference speed, and operating the propeller at the reference speed with the propeller blades in the second position.

17 Claims, 7 Drawing Sheets

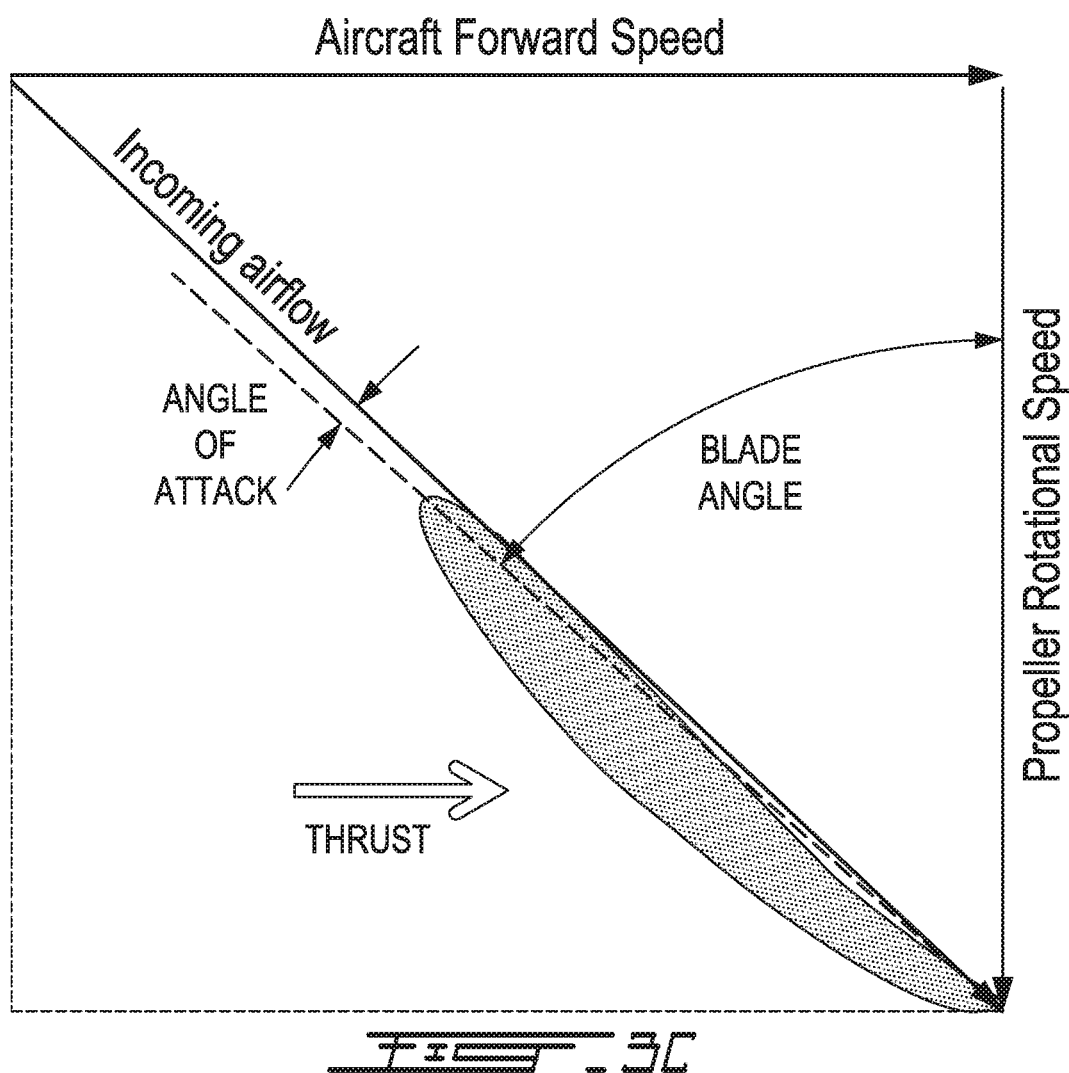

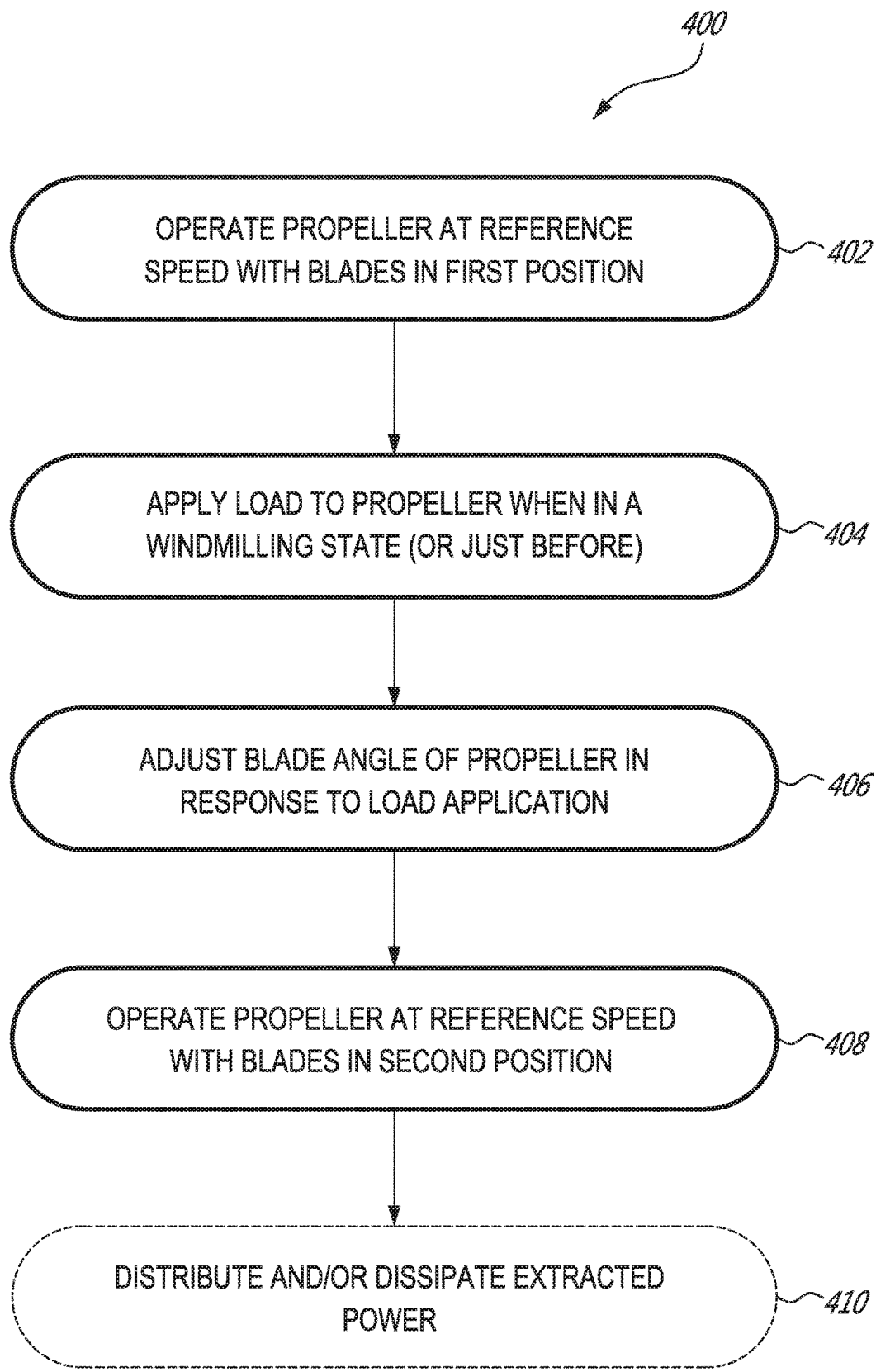

SYSTEM AND METHOD FOR SLOWING DOWN AIRCRAFT

TECHNICAL FIELD

The present disclosure relates generally to aircraft control and more particularly, to aircraft control during the descent and/or approach phases of a flight.

BACKGROUND OF THE ART

Constant speed propellers are controlled by varying the blade angles to maintain the speed of the propeller at a reference speed. In order to do so, the blade angle is increased with increasing power and increasing aircraft speed. The blade angle is decreased with decreasing aircraft speed and decreasing aircraft power. During aircraft descent, the blade angle of a propeller is typically reduced in order to maintain constant speed with the engine power and aircraft speed used for descent. This causes the propeller to be partially or entirely driven by the speed of the aircraft, which is known as "windmilling". However, even when windmilling, the propeller will still generate thrust, which must be countered using other measures in order to slow down the aircraft.

Therefore, improvements are needed.

SUMMARY

In accordance with a broad aspect, there is provided method for slowing down an aircraft having a propeller. The method comprises operating the propeller at a reference speed with the propeller blades in a first position, applying a load to the propeller to slow down a rotational speed of the propeller when the propeller is in a windmilling state or just before the propeller enters the windmilling state, adjusting the propeller blades to a second position in response to the load being applied, to increase the rotational speed of the propeller back towards the reference speed, and operating the propeller at the reference speed with the propeller blades in the second position.

In accordance with another broad aspect, there is provided system for slowing down an aircraft having a propeller. The system comprises a processor and a non-transitory storage medium coupled to the processor and having stored thereon program instructions. The program instructions are executable by a processor for applying a load to the propeller to slow down a rotational speed of the propeller when the propeller is in a windmilling state or just before the propeller enters the windmilling state, the propeller blades being in a first position before the load is applied, adjusting the propeller blades to a second position in response to the load being applied, to increase the rotational speed of the propeller back towards a reference speed, and operating the propeller at the reference speed with the propeller blades in the second position.

In accordance with yet another broad aspect, there is provided a propeller control system comprising a propeller, a pitch change mechanism, a load, and a controller. The controller is configured for applying a load to the propeller to slow down a rotational speed of the propeller when the propeller is in a windmilling state or just before the propeller enters the windmilling state, the propeller blades being in a first position before the load is applied, adjusting the propeller blades to a second position in response to the load being applied, to increase the rotational speed of the propeller back towards a reference speed, and operating the propeller at the reference speed with the propeller blades in the second position.

Features of the systems, devices, and methods described herein may be used in various combinations, in accordance with the embodiments described herein.

BRIEF DESCRIPTION OF THE DRAWINGS

Reference is now made to the accompanying figures in which:

FIG. 3C is a graphical illustration of the relationship between incoming airflow, blade position, and propeller thrust for an aircraft in descent mode with an applied load, in accordance with an illustrative embodiment;

FIG. 6 is a flowchart of a method for slowing down an aircraft, in accordance with an illustrative embodiment.

It will be noted that throughout the appended drawings, like features are identified by like reference numerals.

DETAILED DESCRIPTION

Figure 1:
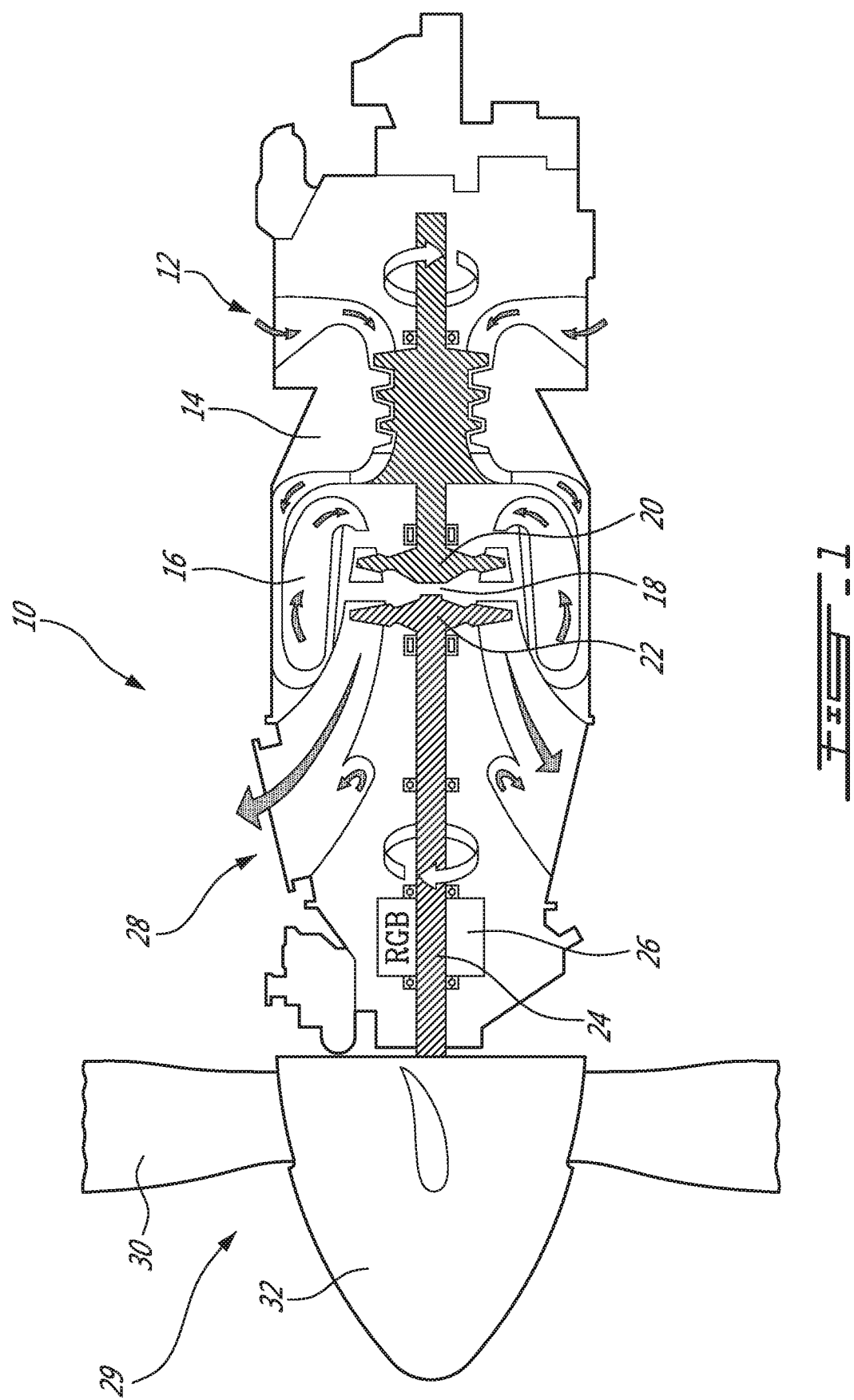
FIG. 1 is a schematic cross-sectional view of a gas turbine engine, in accordance with an illustrative embodiment.

There is described herein methods and systems for slowing down an aircraft in certain flight phases, such as in descent and approach. The aircraft is equipped with an engine having a propeller, such as a turboprop engine. FIG. 1 illustrates an exemplary gas turbine engine 10 comprising an inlet 12, through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 illustratively comprises a compressor turbine 20, which drives the compressor assembly and accessories, and at least one power or free turbine 22, which is independent from the compressor turbine 20 and drives the rotor shaft 24 through the reduction gearbox (RGB) 26. Hot gases may then be evacuated through exhaust stubs 28. Other configurations for a free turbine turboprop engine 10 may also apply.

A propeller 29 through which ambient air is propelled, is composed of a propeller hub 32 and blades 30. The propeller 29 converts rotary motion from the engine 10 to provide propulsive force to the aircraft. Propeller 29 is a constant speed propeller, meaning that it is designed to automatically change its blade angle (or blade pitch) to allow it to maintain a constant rotational speed, regardless of the amount of engine torque being produced, the speed of the aircraft, or the altitude at which the aircraft is flying.

Figure 2:
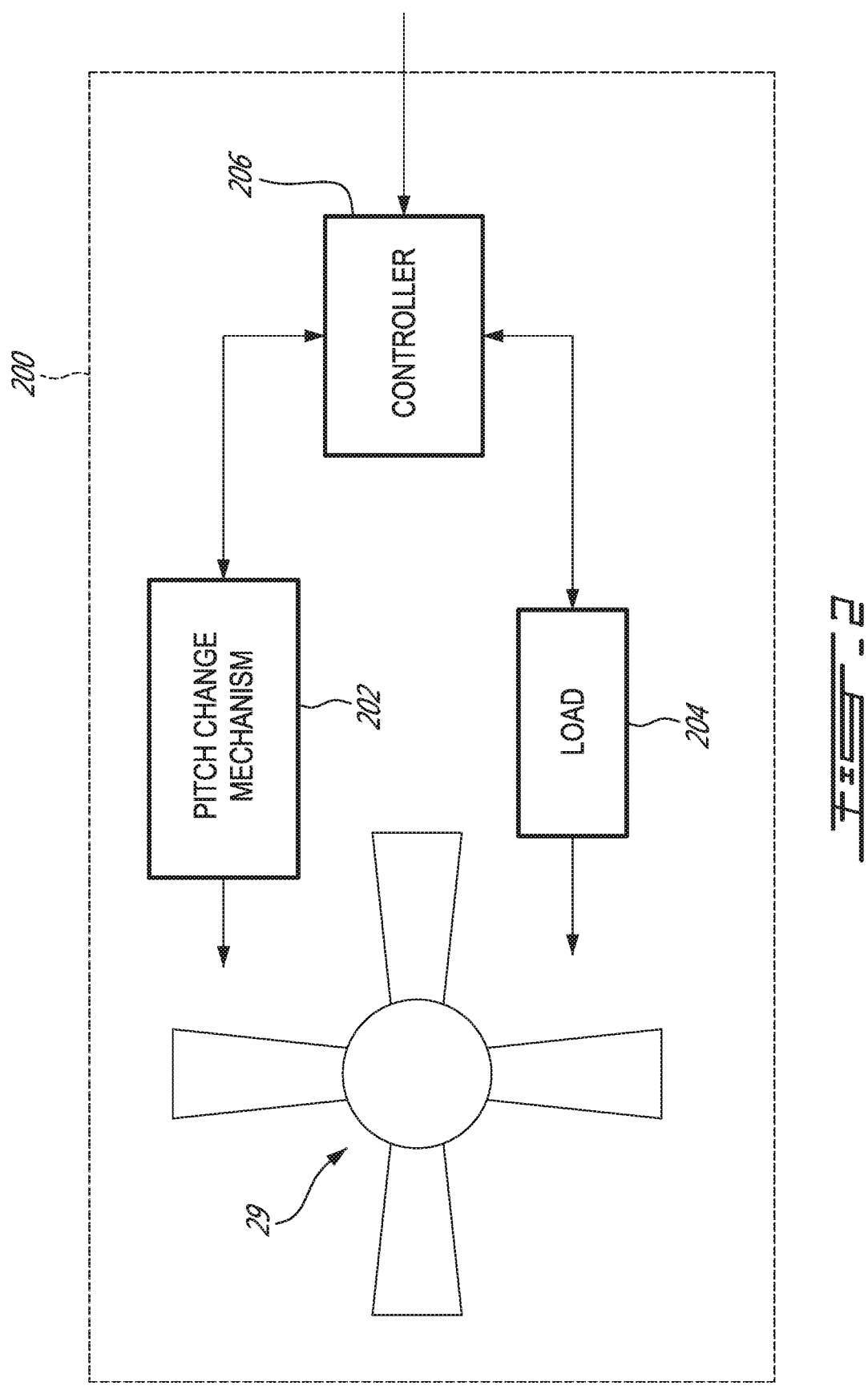
FIG. 2 is a block diagram of a propeller control system, in accordance with an illustrative embodiment.

Referring to FIG. 2, there is illustrated an example embodiment of a propeller control system 200 for propeller 29. The controller 206 responds to a change in propeller rotational speed from a reference speed by countering the change in propeller speed with a change in blade angle in order to maintain the speed of the propeller 29 at the reference speed. The controller 206 senses propeller speeds and instructs the pitch change mechanism 202 to direct oil under pressure to the propeller 29 or to release (i.e. remove) oil from the propeller 29. The change in oil volume going to the propeller 29 changes the blade angle and modifies the propeller speed.

As the propeller 29 is rotated, it generates propeller thrust. The propeller thrust depends on the propeller blade angle. Rotation of the propeller in the air creates drag, which is counteracted by engine torque. A small portion of the total torque is due to losses in the engine gearbox and bearings, so that total engine torque=propeller torque+RGB torque.

When thrust is positive, it results in a forward force on the propeller. When thrust is negative, it results in a backward (or braking) force on the propeller. Propeller drag refers to the resistance of the propeller to the rotation. Propeller drag is produced by the propeller blades 30, and is reduced by decreasing the blade angle. Aircraft drag refers to the aerodynamic force that opposes the aircraft's motion through the air.

Figure 3A:
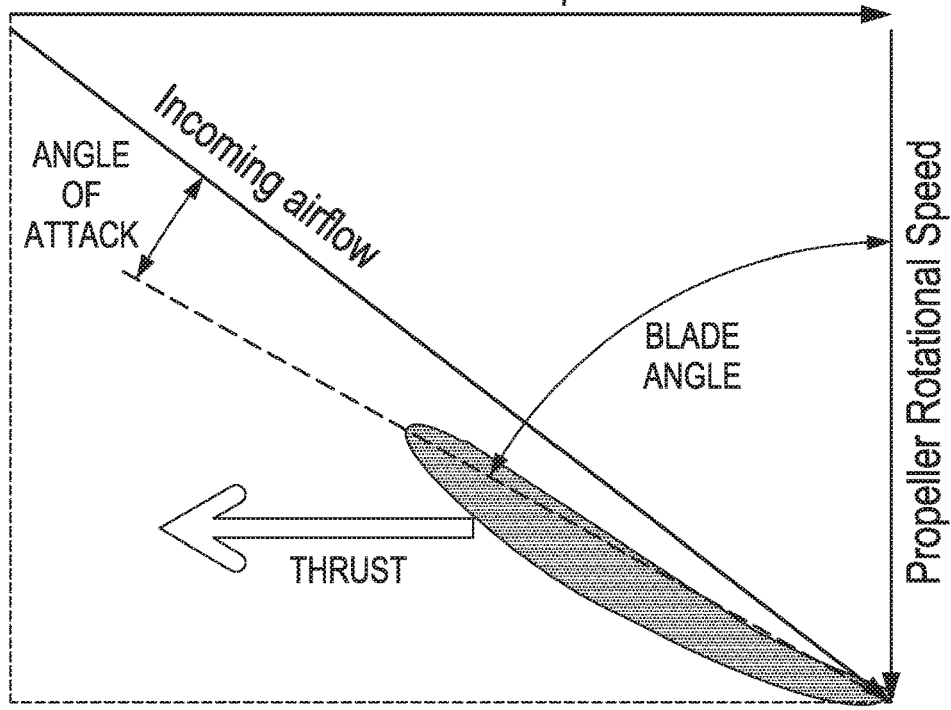
FIG. 3A is a graphical illustration of the relationship between incoming airflow, blade position, and propeller thrust for an aircraft in cruise mode, in accordance with an illustrative embodiment.
Figure 3B:
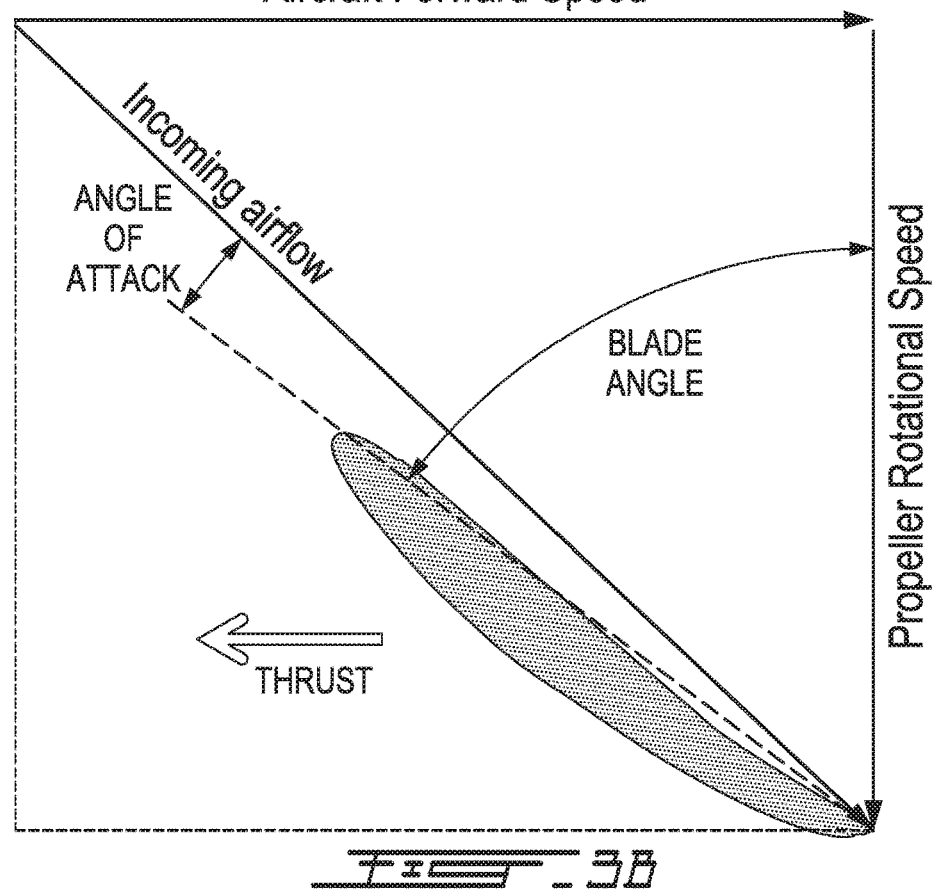
FIG. 3B is a graphical illustration of the relationship between incoming airflow, blade position, and propeller thrust for an aircraft in descent mode, in accordance with an illustrative embodiment.

FIGS. 3a and 3b illustrate the relationship between incoming airflow, blade position, and propeller thrust. Incoming airflow is the vectorial sum of aircraft forward speed and propeller rotational speed. If the aircraft forward speed increases and the propeller rotational speed decreases, the incoming airflow becomes dominated by the aircraft forward speed. If the aircraft forward speed decreases and the propeller rotational speed increases, the incoming airflow becomes dominated by the propeller rotational speed. The angle between the blade and the incoming airflow is the angle of attack (sometimes referred to as the alpha angle). The angle between the blade and the rotational plane of the propeller is the blade angle (sometimes referred to as the beta angle). The angle of attack varies as the incoming airflow varies (i.e. with the aircraft forward speed and the propeller rotational speed), for a fixed blade angle. The blade angle is varied by the controller 206 via the pitch change mechanism 202 so as to maintain a constant rotational speed.

In FIG. 3a, the aircraft is in cruise. The propeller is operating at a reference propeller rotational speed. The blade angle is set in order to maintain rotation of the propeller at the reference speed for a given aircraft speed. The propeller thus generates positive thrust. If propeller rotational speed increases, the blade angle is increased in order to increase the angle of attack (thus increasing propeller drag) and return the propeller rotational speed to the reference speed. If propeller rotational speed decreases, the blade angle is decreased in order to decrease the angle of attack (thus decreasing propeller drag) and return the propeller rotational speed to the reference speed.

In FIG. 3b, the aircraft is in descent. If the engine power is reduced in order to begin descent, this causes the propeller rotational speed to decrease. The blade angle is decreased in response to the slower propeller rotational speed in order to keep the propeller rotating at the reference speed. If the nose of the aircraft is pointed downwards, the aircraft speed increases, thus causing the incoming airflow to change and the angle of attack to decrease. This in turn causes the rotational speed of the propeller to increase. In response, the blade angle is increased to keep the propeller rotating at the reference speed. As shown, the thrust generated by the propeller while the aircraft is in descent is smaller than while the aircraft is in cruise, but is still positive, even when the angle of attack is as small as possible and the propeller is windmilling, meaning that the propeller is partially or entirely driven by the speed of the aircraft.

Referring back to FIG. 2, the controller 206 applies a load 204 to the propeller 29 when the propeller is in the windmilling state or right before the propeller enters the windmilling state, to remove kinetic energy therefrom and slow down the rotational speed of the propeller 29. In response to the reduced speed of the propeller 29, the controller 206 causes an adjustment to the blade angle of the propeller 29 in order to bring the rotational speed of the propeller 29 back towards the reference speed. This scenario is illustrated in FIG. 3c. The angle of attack in FIG. 3c is smaller than the angle of attack in FIG. 3b, and the resulting propeller thrust is negative. This is caused by forcing the propeller to operate at a blade angle that will cause a torque that is positive and a thrust that is negative. This concept is illustrated in FIGS. 4a and 4b.

Figure 4A:
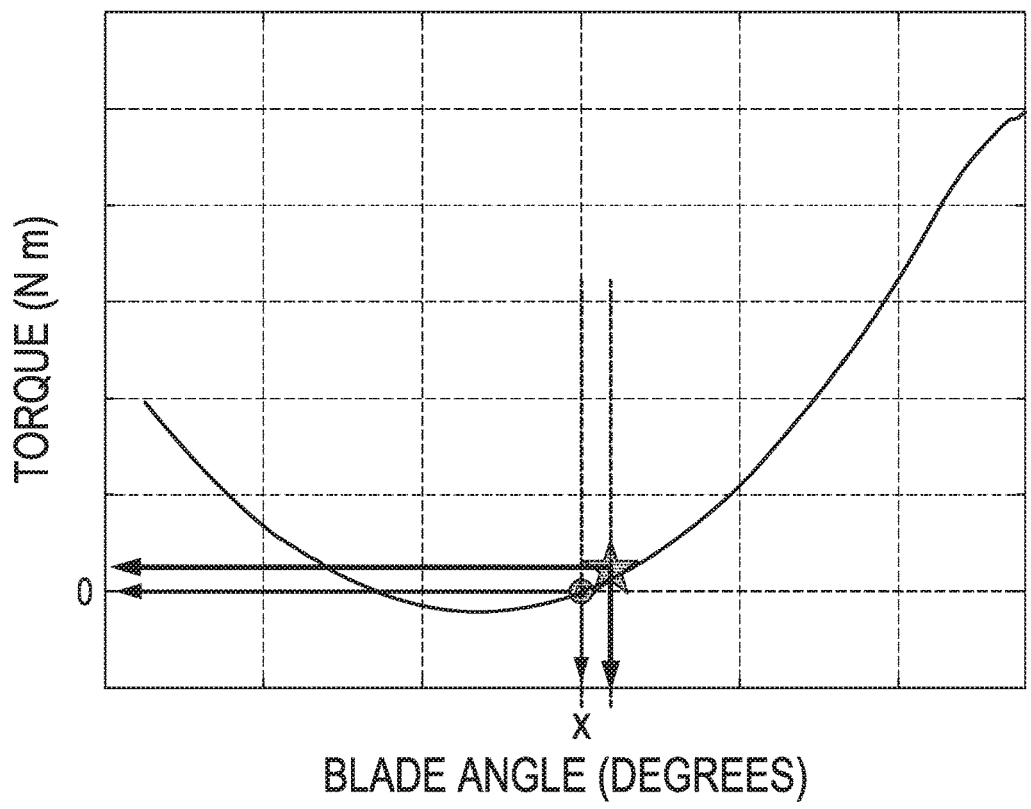
FIG. 4A is a graph of blade angle vs torque, in accordance with an illustrative embodiment.
Figure 4B:
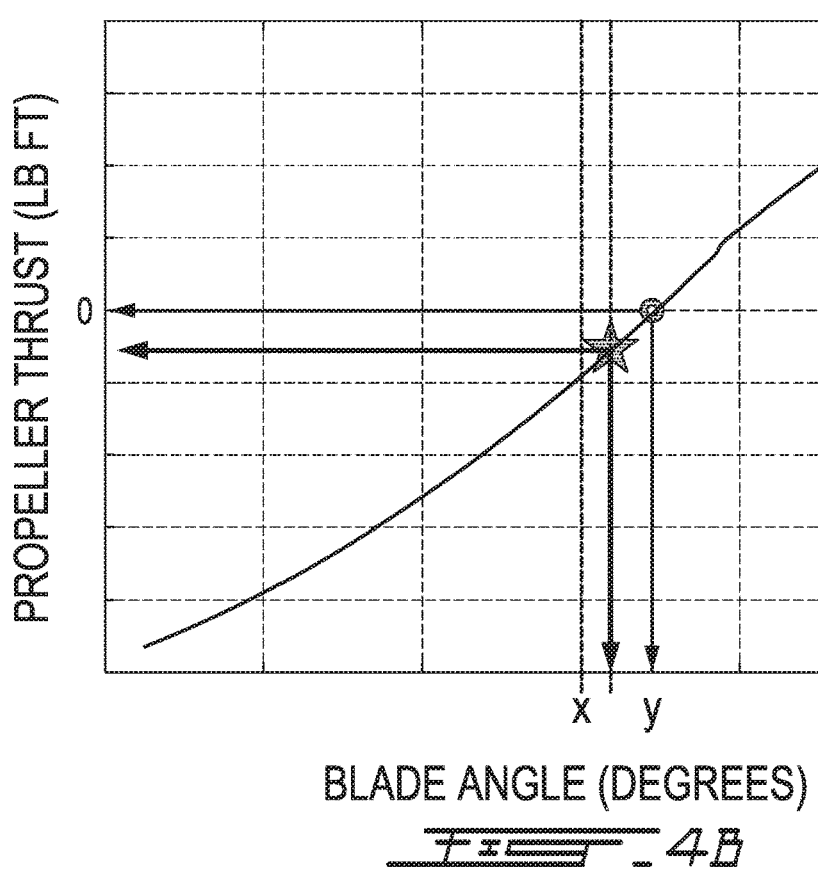
FIG. 4B is a graph of blade angle vs propeller thrust, in accordance with an illustrative embodiment.

In FIG. 4a, there is illustrated an example curve for torque of the propeller when the aircraft is travelling at a given fixed speed. As shown, the blade angle for which the torque is zero is x degrees. FIG. 4b illustrates an example curve for propeller thrust when the aircraft is travelling at the same given fixed speed. As can be seen, the blade angle for which the thrust is zero is y degrees, and y>x. There is therefore an operating zone for blade angle, identified by a star on the curve and found between x and y, where torque is positive and thrust is negative. The propeller control system 200 uses the load 204 to slow down the rotational speed of the propeller and force the controller 206 to set the blade angle to a value corresponding to this operating zone.

When used for the descent/approach phase of a flight, aircraft flight patterns may be optimized by allowing for greater descent angles without increasing the aircraft speed, nor propeller speed. More time may be spent at high altitude cruise speeds. This is especially useful for aircraft which have sleek aerodynamics (i.e. low drag profile) that are optimized for high speeds and that use low descent angles to prevent excessive speed.

The pitch change mechanism 202 may take different forms, depending on the type of engine 10 and/or aircraft. In some embodiments, the pitch change mechanism 202 is a single acting pitch change actuator and the propeller 29 incorporates a single acting piston. In some embodiments, the pitch change mechanism 202 is a double acting pitch change actuator and the propeller 29 incorporates a double acting piston.

The reference speed may be set, for example in rotations per minute (rpm), via a cockpit control. When the engine 10 is operating below the reference speed, the propeller 29 is said to be operating in an underspeed condition. The controller 206 will instruct the pitch change mechanism 202 to meter oil flow to decrease propeller pitch and raise engine rpm. When the engine 10 is operating above the reference speed, the propeller 29 is said to be operating in an overspeed condition. The controller 206 will instruct the pitch change mechanism 202 to meter oil flow to increase propeller pitch and lower engine rpm. When the engine 10 is operating at the reference speed, the propeller 29 is said to be operating in an on-speed condition. The propeller blade angles are not changing. If something happens to unbalance the forces on the propeller 29, such as a change in aircraft speed and/or a change in engine power, or the reference speed is changed via the cockpit control, then an underspeed or overspeed condition results and the controller 206 will react accordingly.

The load 204 may take many forms. In some embodiments, the load 204 is a mechanical load applied to the shaft 24 of the engine 10. Friction caused by applying the mechanical load on the rotating shaft 24 slows down the rotation of the propeller 29. Displacement of the mechanical load may be controlled by the controller 206. The mechanical load may be mounted to the engine 10 or may be provided separately therefrom and positioned to contact the shaft 24 upon receipt of a control signal from the controller 206.

In some embodiments, the load 204 is an electrical load that extracts power from the propeller 29. For example, the electrical load may be an electric motor, an alternator, a generator, and the like. In some embodiments, the electrical load is used only for slowing down the aircraft. Alternatively, the electrical load is used throughout the flight in order to optimize the added weight on the aircraft. In such a case, use of the electrical load is modulated during the flight phases in which it is used to slow down the aircraft, such as approach and descent.

In some embodiments, the load 204 is applied and/or removed progressively to the propeller 29, in order to allow the controller 206 time to react to the change in rotational speed of the propeller 29. A change in rotational speed that is too drastic may cause an overspeed condition when removing the load.

In some embodiments, the load 204 is mounted to the reduction gearbox 26 of the engine 10. For example, the load 204 may be mounted using any one of a bevel gear arrangement, a spur gear arrangement, and an axial coupling arrangement. The electrical load may be mounted directly on a reduction gearbox pad or through a belt driven pulley on the shaft 24. In some embodiments, the load 204 is mounted to an accessory gearbox (not shown) of the engine 10 instead of to the reduction gearbox 26. It will be understood that other embodiments for mounting the load 204 to the engine 204 may also apply.

In some embodiments, the extracted power is routed to one or more aircraft system. For example, the extracted power may be provided to a lighting system, a heating system, a fuel system, an engine starting system, and the like. Many different aircraft systems may benefit from the power extracted from the propeller 29 during the braking operation, such as but not limited to avionics, pumps, window heating, ice rain protection, cooling fans, and HVAC. In some embodiments, the extracted power is stored in a power storage medium, such as a battery or a capacitor, for use at a later time. In some embodiments, the extracted power is used to recharge one or more devices, such as a battery and the like. In some embodiments, the extracted power is dissipated in heat, such as in an anti-ice or de-icing system or used to pump oil/fuel.

Figure 5:
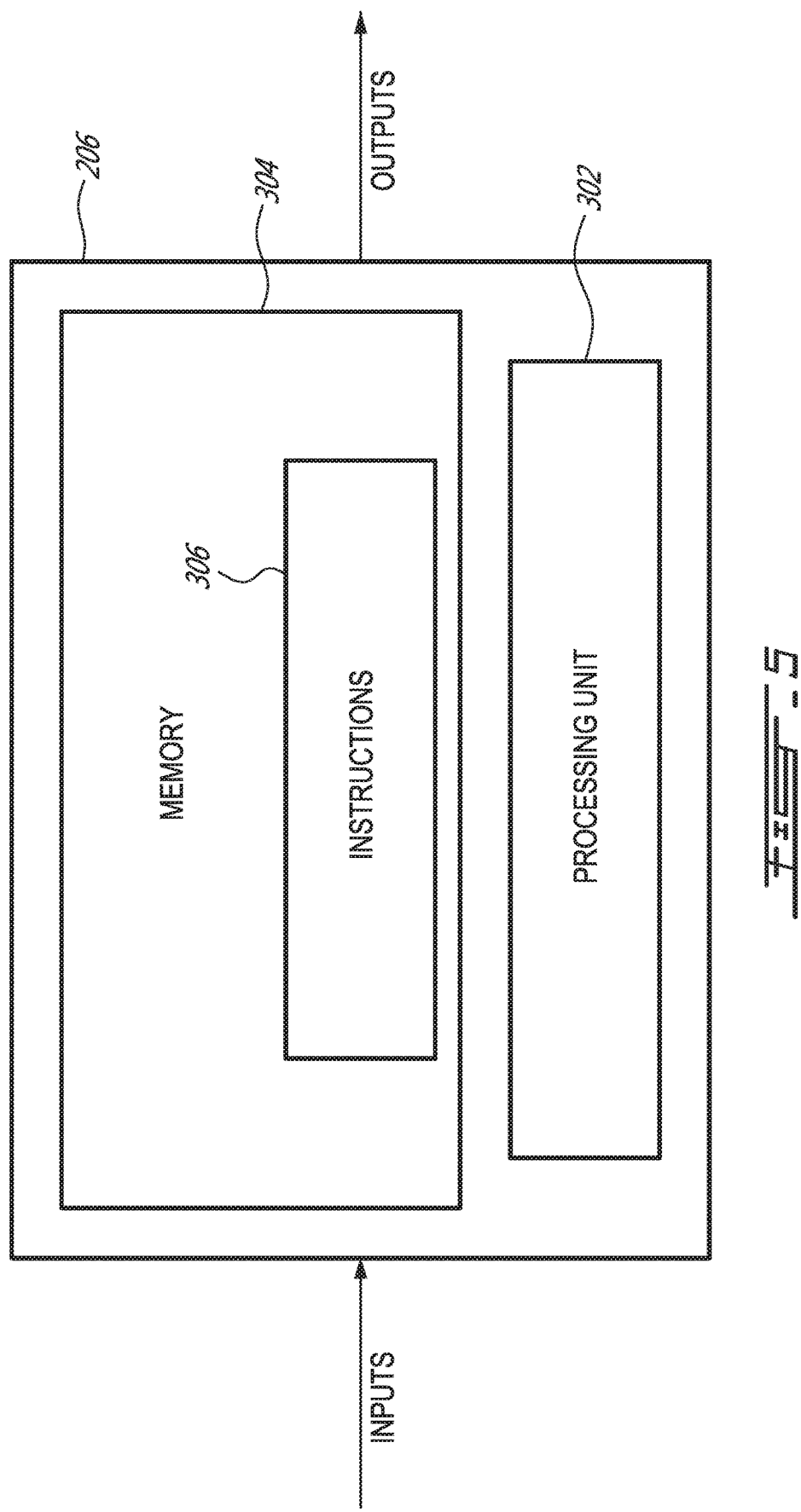
FIG. 5 is a block diagram of a controller from the system of FIG. 2, in accordance with an illustrative embodiment.

FIG. 5 illustrates a schematic diagram of controller 206, exemplary of an embodiment. As depicted, controller 206 includes at least one processing unit 302 and memory 304. The memory 304 has stored therein computer-executable instructions 306. The processing unit 302 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof. In some embodiments, the controller 206 is an engine computer. In some embodiments, the controller 206 is an aircraft computer. In some embodiments, the controller 206 forms part of the engine computer or the aircraft computer.

The memory 304 may comprise any suitable known or other machine-readable storage medium. The memory 304 may comprise non-transitory computer readable storage medium, for example, but not limited to, an electronic, magnetic, optical, electromagnetic, infrared, or semiconductor system, apparatus, or device, or any suitable combination of the foregoing. The memory 304 may include a suitable combination of any type of computer memory that is located either internally or externally to controller 206, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 304 may comprise any storage means (e.g., devices) suitable for retrievably storing machine-readable instructions 306 executable by processing unit 302.

The inputs to the controller 206 may come from the aircraft computer, the engine computer, the cockpit control, various engine/propeller/aircraft sensors, and the like. For example, engine speed, propeller speed and reference speed may be received as inputs to the controller 206.

In some embodiments, the inputs comprise an enable signal for the propeller control system 200. For example, aircraft condition signals such as power lever angle (PLA), pilot command, and aircraft in flight signal (weight-on-wheels) may be used to enable the propeller control system 200. The aircraft condition signals may be passed through an AND gate which outputs an enable signal when all conditions are met. The enable signal is then received as an input by the controller 206. Alternatively, the aircraft condition signals are themselves received as inputs to the controller 206 and processed to enable the propeller control system 200, Other aircraft condition signals may also be used to enable/disable the propeller control system 200, such as but not limited to flap positions, minimum/maximum aircraft altitude, engine speed, propeller speed, and reference speed.

The outputs of the controller 206 may be directed to the pitch change mechanism 202 and to the load 204. For example, the outputs of the controller 206 may comprise oil metering signals sent to the pitch change mechanism 202 for adding or removing oil from the propeller 29 so as to change the pitch of the propeller. In other embodiments, the pitch change mechanism 202 effects an electronic control over blade angles and the controller 206 provides pitch control signals to the pitch change mechanism 202 that will vary propeller speed. In another example, the outputs of the controller 206 comprise load control signals. The load control signals may be used to actuate a mechanical load so as to contact the propeller shaft and disengage therefrom. The load control signals may be used to drive an electrical load to extract power from the propeller shaft and to remove the electrical load from the propeller shaft. The load control signals may also modulate the amount of power extracted from the propeller shaft using the electrical load.

The outputs of the controller 206 may comprise power routing signals, for causing power extracted from the propeller shaft to be routed to other aircraft systems and/or to power storage devices. In some embodiments, the power routing signals may trigger various switching arrangements to allow power to be routed accordingly. Alternatively, the power routing signals may be sent to the aircraft computer or the engine computer, for instructing the aircraft computer or the engine computer to manage the extracted power.

The instructions 306 may be implemented in a high level procedural or object oriented programming or scripting language, or a combination thereof, to communicate with or assist in the operation of a computer system, for example the controller 206. Alternatively, the instructions 306 may be implemented in assembly or machine language. The language may be a compiled or interpreted language. The instructions 306 may be readable by a general or special-purpose programmable computer.

Referring to FIG. 6, there is illustrated a flowchart for an example embodiment of a method 400, as performed by the instructions 306 when executed by the processing unit 302 of the controller 206. At step 402, the propeller is operated at the reference speed with the propeller blades in a first position. At step 404, the load 204 is applied to the propeller 29 when the propeller is in a windmilling state. In some embodiments, the load 204 may also be applied to the propeller 29 just before the propeller is in a windmilling state, when at cruise, before reducing power and beginning descent. Application of the load 204 will slow down the rotational speed of the propeller 29. At step 406, the blade angle of the propeller is adjusted in response to the load being applied, to a second position. The blade angle is modified, and more specifically reduced, to bring the rotational speed of the propeller back towards the reference speed. At step 408, the propeller 29 is operated at the reference speed with the blades in the second position. The extra aircraft drag created by having the propeller blades in the second position can be leveraged to allow steeper descent patterns for the aircraft without increasing aircraft speed.

At step 410, the extracted power is optionally distributed and/or dissipated in the aircraft, to one or more aircraft systems. It should be understood that step 410 may be performed concurrently with steps 406 or 408, at any time after the power has been extracted from the propeller by application of the load, at step 404.

In some embodiments, the amount of power extracted via the load application, as per step 404, is modulated as a function of various aircraft parameters, such as aircraft speed, aircraft altitude, descent angle, and other parameters that are determinant to the descent/approach flight phase.

In some embodiments, the adjustment of blade angle, as per step 406, is performed down to a minimum blade angle.

Embodiments of the method 400 may also be implemented by way of a non-transitory computer-readable storage medium having a computer program stored thereon. The computer program may comprise computer-readable instructions which cause a computer, or in some embodiments the processing unit 302 of the controller 206, to operate in a specific and predefined manner to perform the steps of method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for slowing down an aircraft having a propeller and propeller blades, the method comprising:
   operating the propeller at a reference speed with the propeller blades in a first position;
   applying a load to the propeller to slow down a rotational speed of the propeller when the propeller is in a windmilling state or just before the propeller enters the windmilling state;
   adjusting the propeller blades to a second position in response to the load being applied, to increase the rotational speed of the propeller back towards the reference speed; and
   operating the propeller at the reference speed with the propeller blades in the second position.

2. The method of claim 1, wherein applying the load to the propeller comprises applying a mechanical load to a rotating shaft of the propeller.

3. The method of claim 1, wherein applying the load to the propeller comprises applying an electrical load to extract power from the propeller.

4. The method of claim 3, further comprising distributing the power extracted from the propeller to one or more systems in the aircraft.

5. The method of claim 3, further comprising dissipating in heat the power extracted from the propeller.

6. The method of claim 1, wherein applying the load to the propeller comprises using an accessory mounted to a reduction gear box of an engine coupled to the propeller.

7. The method of claim 1, wherein adjusting the propeller blades to the second position comprises decreasing a blade angle of the propeller blades.

8. The method of claim 3, wherein applying the load to the propeller comprises extracting power as a function of a speed of the aircraft.

9. A system for slowing down an aircraft having a propeller, the system comprising:
   a processor; and
   a non-transitory storage medium coupled to the processor and having stored thereon program instructions executable by the processor for:
   applying a load to the propeller to slow down a rotational speed of the propeller when the propeller is in a windmilling state or just before the propeller enters the windmilling state, the propeller blades being in a first position before the load is applied;
   adjusting the propeller blades to a second position in response to the load being applied, to increase the rotational speed of the propeller back towards a reference speed; and
   operating the propeller at the reference speed with the propeller blades in the second position.

10. The method of claim 9, wherein applying the load to the propeller comprises applying a mechanical load to a rotating shaft of the propeller.

11. The method of claim 9, wherein applying the load to the propeller comprises applying an electrical load to extract power from the propeller.

12. The method of claim 11, wherein the program instructions are further executable for distributing the power extracted from the propeller to one or more systems in the aircraft.

13. The method of claim 11, wherein the program instructions are further executable for dissipating in heat the power extracted from the propeller.

14. The method of claim 9, wherein applying the load to the propeller comprises using an accessory mounted to a reduction gear box of an engine coupled to the propeller.

15. The method of claim 9, wherein adjusting the propeller blades to the second position comprises decreasing a blade angle of the propeller blades.

16. The method of claim 11, wherein applying the load to the propeller comprises extracting power as a function of a speed of the aircraft.

17. A propeller control system comprising:
a propeller coupled to an engine, the propeller having propeller blades;
a pitch change mechanism;
a load; and
a controller configured for:
applying the load to the propeller to slow down a rotational speed of the propeller when the propeller is in a windmilling state or just before the propeller enters the windmilling state, the propeller blades being in a first position before the load is applied;
adjusting the propeller blades to a second position in response to the load being applied, to increase the rotational speed of the propeller back towards a reference speed; and
operating the propeller at the reference speed with the propeller blades in the second position.

* * * * *